United States Patent [19]
Nattefort

[11] 3,837,718
[45] Sept. 24, 1974

[54] MACHINING DEVICE WITH A ROTARY WORKING SPINDLE

[75] Inventor: Fritz Nattefort, Leichlingen, Germany

[73] Assignee: Rockwell International Corporation, Pittsburgh, Pa.

[22] Filed: Mar. 2, 1972

[21] Appl. No.: 231,116

[30] Foreign Application Priority Data
Mar. 5, 1971 Germany.................. P 21 10 662.7

[52] U.S. Cl. ............................................. 308/77
[51] Int. Cl. ........................................ F16c 37/00
[58] Field of Search ............ 308/77, 76; 310/52, 54

[56] References Cited
UNITED STATES PATENTS
2,740,267  4/1956  Bayard .................................. 308/76

Primary Examiner—Manuel A. Antonakas
Assistant Examiner—Frank Susko
Attorney, Agent, or Firm—William A. Strauch et al.

[57] ABSTRACT

A machining device which includes a housing surrounding a rotary working spindle and a motor for rotating the spindle along with internally located arrangements for circulating a coolant and a lubricant through the device.

14 Claims, 4 Drawing Figures

PATENTED SEP 24 1974    3,837,718

MACHINING DEVICE WITH A ROTARY WORKING SPINDLE

This invention relates to a machining device with a working spindle which rotates around a pivot and is mounted in an essentially enclosed housing and which is driven by a motor that creates heat due to energy losses and, in particular, to a grinding spindle driven by an electric motor.

Such grinding spindles are chiefly accessory apparatus and are used, e.g., for delicate internal grinding operations in which they are attached by appropriate jigs to boring mills and milling cutters of comparable precision. They have a rigid steel housing which the jig engages and by which they are guided during the machining operations. To maintain stability under operating and tension loads, the housing has a considerable wall thickness. Supported inside the housing is the grinding spindle proper, which is driven by a high-frequency electric motor and which can attain idling speeds of 100,000 rpm. The motor and the spindle with its bearings are located in an essentially enclosed chamber of the housing in order to protect them against external influences. Thus, there is a problem of supplying cooling agents and lubricants to this chamber.

Aside from this problem, effective cooling and lubrication of such an operating device must be effected without installing additional special circuits either outside or inside of the housing due to lack of space.

In the present invention, channels through which the cooling agents and the libricants can flow are formed in and distributed over the inner wall of the housing.

Thus, the housing which is thick-walled for purposes of stability as already mentioned, is utilized to supply cooling agents and lubricants, avoiding the need for special circuits which, due to the high requirements of precision and symmetry of such instruments, are very difficult to house, especially in the area of the motor and of the bearings. Also, the invention makes possible an especially slim construction of the machining device because its outside diameter is limited only by the diameter of the driving mechanism and the thickness of the housing wall.

The preferred embodiment of the invention has a cylindrical housing coaxial with the working spindle. It is preferred that the channels be formed as axial passages extending parallel to the axis of the device in this embodiment because such passages can be relatively easily made by drilling.

To connect the several axial passages to each other and thus create a continuous cooling passage system on the surface of the housing conduits extending transversely of the housing, into which the axial passages open are provided at the ends of the housing area to be cooled. The area to be cooled is determined by the dimensions of the driving mechanism and of the bearings.

In the preferred construction, these conduits are end passages which connect two adjacent axial cooling agent passages and extend along an arc around the housing axis in a plane normal to the latter.

With end passages provided at both extremities of the area to be cooled and connecting successive axial cooling agent passages in a staggered, end-to-end series arrangement, there is a serpentine pattern of flow of the cooling agent, which results in a uniform cooling effect over the entire surface of the housing.

Constructionally, it is very simple to divide the housing so that there is a section having planes normal to the axis of the device at the extremities of the area to be cooled and machine the end passages in the ends of the housing sections. The manufacture of the entire cooling passage system consequently only requires drilling from and milling at the ends of the housing section.

An especially advantageous feature of the invention is that the supply and exhaust channels for the cooling agents and lubricants open onto the same end of the housing. This end is preferably the end opposite the output side of the machining device freeing the output side of annoying supply lines. This is especially important with small precision instruments as only limited space is available in the working area. This single location line connection is an advantage obtained from the locating of the channels in the housing wall, as it would not be practical to route the supply lines to the bearings at the opposite sides of the driving mechanism without impairing the driving mechanism. Also, without the arrangement in question it would also be necessary to lead the supply lines to the bearings out of the machining device on both sides of the device.

For a machining device with two bearings for the rotating spindle which are longitudinally spaced from each other, which is the preferred form of construction for the grinding spindle, another feature of the invention is that the lubricant supply channel has, at one end of each bearing, a passage which is radially directed towards the interior of the device and which opens into an annular conduit adjacent to the corresponding bearing.

This provides for a separate and immediate introduction of lubricants to both bearings and the reliable supply of lubricant required because of the high speed of spindle rotation.

The lubricant is removed on the sides of the bearings opposite the annular conduits after its passage through the bearings so that the lubrication is always effected with clean lubricants, thus avoiding any accumulation of foreign matter inside the housing.

Another important feature of the invention is that the cooling air exhausts the lubricant from the device by virtue of a connection between the lubricant system and the cooling system. Thus, special circuits and pump mechanisms for removal of the used lubricant are not required.

For a lubricant movable by using a vacuum such as the oil mist utilized in the preferred form of grinding spindle, transverse conduits running from the regions of the bearings on the sides thereof opposite the annular conduits into the cooling air circuit are provided.

The cooling air passing through the cooling air circuit produces a vacuum in these transverse conduits which results in the oil being entrained in the cooling air and thus removed from the inside of the housing.

While the transverse conduits open into the cooling air drain channel so that there is a common withdrawal of cooling air and oil mist, cooling air and oil mist are preferably supplied separately and the cooling and lubrication effected separately up to this point for practical reasons.

One form of the invention is the grinding spindle shown in the drawing in which.

Figure 1:
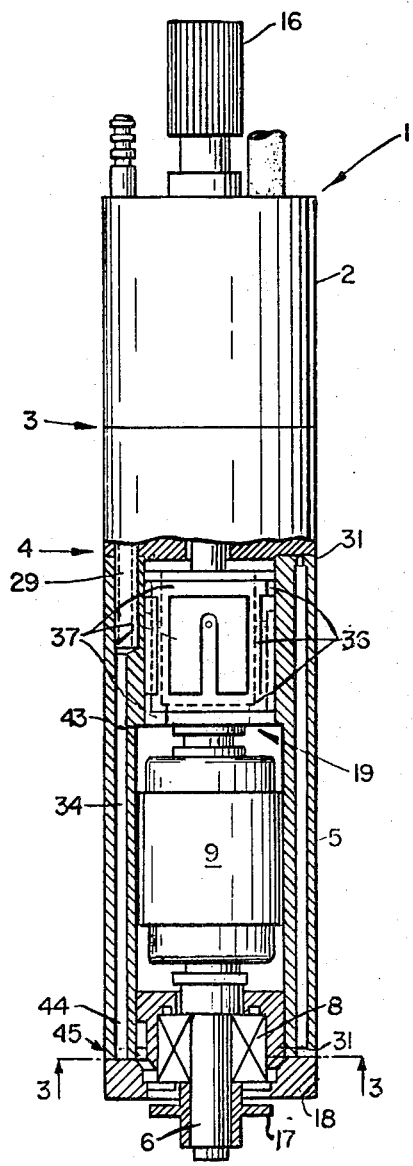
FIG. 1 is a view of the grinding spindle with the housing partially sectional along line 1—1 of FIG. 3.
Figure 2:
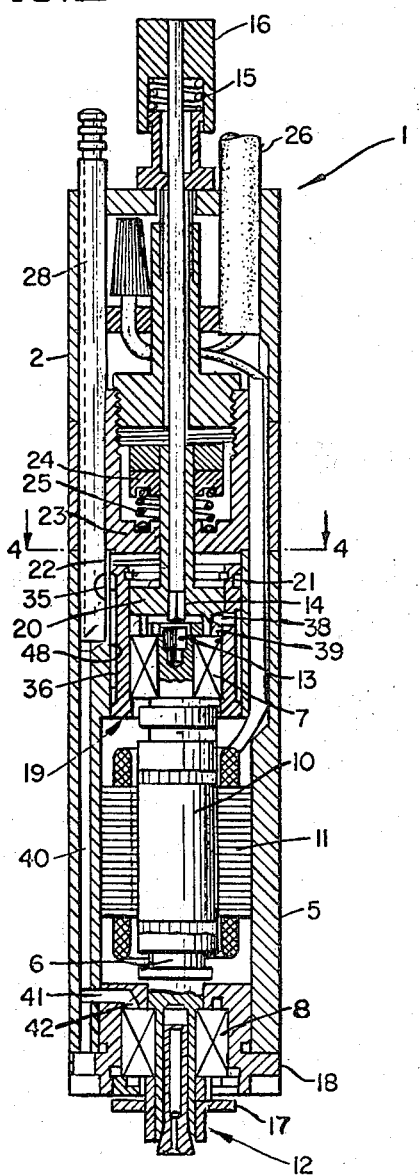
FIG. 2 is a longitudinal cross section through the grinding spindle along line 2—2 of FIG. 4.
Figure 3:
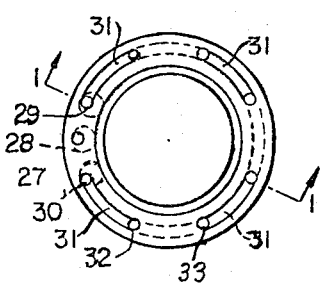
FIG. 3 is a transverse section through the grinding spindle along line 3—3 of FIG. 1.
Figure 4:
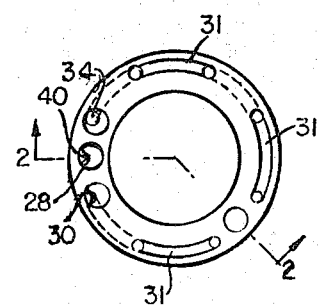
FIG. 4 is a transverse section through the grinding spindle along line 4—4 of FIG. 2.

The grinding spindle as such is labelled 1 in FIGS. 1 and 2 and comprises a cylindrical housing 2, which is divided into sections terminating at planes 3, 4, and 45 which are normal to the cylindrical axis of the housing. Shaft 6, which is, properly speaking, the spindle, is supported in bearings 7 and 8 in housing section 5 and is driven by a high-frequency electric motor 9. Shaft 6 supports the centrally located armature 10 of the motor which is surrounded by its stator 11.

On the end of shaft 6 at the output side of the machining device is a collet mechanism 12 for mounting grinding tools. In the other end of shaft 6 is an internal polygonal recess or seat 13. A cooperating polygonal bar 14 can be advanced by compressing the spring 15 by means of handle 16 until it engages internal seat 13. This locks shaft 6, permitting collet mechanism 12 to be either tightened or loosened by rotating adjusting sleeve 17.

One spindle supporting bearing 8 is fixedly mounted in a flanged bushing 18 longitudinally of grinding spindle 1. The second spindle supporting bearing 7 is housed in a longitudinally displaceable, guided bushing 19 and is retained therein by a pressure plate 20 and a cup spring 21. Pressure plate 20 has an extension 22 which extends through a central bore in partition 23 of housing 2. On the protruding end of extension 22 opposite the bearings and motor 9, there is screwed a jig 24 which is separated by a spring 25 from the partition 23 and which thereby biases guide bushing 19 and bearing 7 away from bearing 8 with a force determined by the design of spring 25. This system accommodates adjustment between bearings 7 and 8 as well as deflection due to thermal expansions of the spindle, thus reducing variations from the initial loadings on the bearings.

At the end of grinding spindle 1 opposite the output side are the handle 16 for locking shaft 6, the power supply line 26 for the high-frequency electric motor, and connections for the cooling agents and the lubricant; viz., the cooling air supply line 27, the oil mist supply line 28 and the cooling air and oil mist drain 29. These conduits open into longitudinal channels in the wall of housing 2.

The cooling air flows from supply line 27 through longitudinal channel 30 until it reaches the flanged bushing 18 at the level of plane 45. At this end of housing section 5, transverse passages 31 are milled in its ends, the first leading in a peripheral direction ot the next longitudinal channel 32, which extends back in the wall of housing section 5 to plane 4 and the thereadjacent end of the housing section. Here in the end of housing section 5 is another transverse passage 31 which connects longitudinal channel 32 in a peripheral direction with the next longitudinal channel 33 so that the flow path again leads back to flanged bushing 18. In this manner, the flow path of the cooling air continues in serpentine fashion over the entire surface of housing section 5. The last longitudinal channel 34 opens into the cooling air drain channel 29, which is located at the end of grinding spindle 1 opposite its output side.

The oil mist lubricant is fed through oil mist supply line 28, which also passes through the housing wall longitudinally of grinding spindle 1. At 35 there is a radial discharge opening which allows the oil mist to flow into the space between the inside wall of housing section 5 and guide bushing 19. Guide bushing 19 has channels 36 on its upper side which extend longitudinally of and peripherally around guide bushing 19 and through which the oil mist can flow. The raised flanges 37 between the channels 36 delineate the peripheral areas and support guide bushing 19 from the inside wall of housing section 5. Between flanges 37 and the inside housing section wall 48 the oil mist forms a very fine oil film on which guide bushing 19 moves.

The oil mist flows from channels 36 through radially extending discharge openings 38 into an annular chamber 39 immediately adjacent bearing 7, from which it is transferred to bearing 7 to lubricate it.

Another part of the oil mist is fed from supply line 28 through channel 40 to radial discharge opening 41 from which it reaches annular chamber 42. From annular chamber 42 the oil mist enters bearing 8.

On the sides of bearings 7 and 8 opposite annular chambers 39 and 42, there are transverse channels 43 and 44, respectively, which open into the cooling air channel 34 connected to cooling air drain channel 29. The cooling air flowing through channel 34 creates a vacuum in transverse channels 43 and 44, exhausting the oil mist from the corresponding sides of bearings 7 and 8. Drain channel 29 serves thus for the removal of both cooling air and oil mist.

The invention may be embodied in othe specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A tool or like device comprising: a housing; a working spindle; bearing means rotatably supporting said spindle in said housing; a motor in said housing for rotating said spindle; and means comprising interconnecting flow passages formed in said housing through which cooling air and a lubricant can be circulated to dissipate heat generated by said motor and to lubricate said bearing means, said housing being cylindrical and coaxial with the working spindle and said flow passages including passages extending longitudinally in said housing in generally parallel relationship to the longitudinal axis of the housing and transverse passages formed in said housing at locations corresponding generally to the extremities of the portion of the device which is to be cooled, said transverse passages being oriented at right angles to and communicating with the longitudinal flow passages, the transverse passages being of arcuate configuration and each said transverse passage connecting two adjacent longitudinal coolant passages to provide communication therebetween.

2. A device according to claim 1, wherein the longitudinal passages connected by the transverse passages at one of said locations are so related to those connected by the transverse passages at the other of said locations that the longitudinal passages are connected into a serpentine flow path and wherein there are longitudinal coolant passages at intervals entirely around the housing so that the cooling effect will be generally uniform therearound.

3. A device according to claim 2, wherein said housing includes a section having end faces at said first and second locations and wherein said transverse passages are formed in said end faces of the housing section.

4. A tool or like device comprising: a housing; a working spindle; bearing means rotatably supporting said spindle in said housing; a motor in said housing for rotating said spindle; means comprising interconnecting flow passages formed in said housing through which cooling air and a lubricant can be circulated to dissipate heat generated by said motor and to lubricate said bearing means; and supply lines for said coolant and said lubricant and a drain line therefor; said supply and drain lines each being connected to one of said longitudinal passages and all of said lines communicating with said longitudinal passes through the same end of said housing.

5. A tool or like device comprising: a housing; a working spindle; bearing means rotatably supporting said spindle in said housing; a motor in said housing for rotating said spindle; and means comprising interconnecting flow passages formed in said housing through which cooling air and a lubricant can be circulated to dissipate heat generated by said motor and to lubricate said bearing means, said bearing means comprising a plurality of bearings at locations spaced longitudinally along said working spindle and said flow passages including passages extending longitudinally in the housing, means providing an annular channel around each bearing at one end thereof, and a radially extending passage between a longitudinally extending passage and each of said annular channels, whereby the lubricant can flow from said last-mentioned passages through said radial passages and annular channels to the bearings with which they are associated.

6. A device according to claim 5, together with means for removing the lubricant therefrom after said lubricant has passed through said bearings.

7. A device according to claim 6, wherein the means for removing the lubricant comprises means for entraining the lubricant in the air circulated through said housing.

8. A device according to claim 7, wherein said last-mentioned means comprises lubricant exhaust passages extending from said bearings at the sides thereof opposite the annular channels to selected ones of said longitudinal coolant passages.

9. A device according to claim 9, wherein the longitudinal passage with which the lubricant exhaust passages communicate is a collant exhaust passage.

10. A tool or like device comprising: a housing; a working spindle; bearings rotatably supporting said spindle in said housing; a motor in said housing for rotating said spindle; a first fluid flow system in said housing and in fluid communication with said bearings; means for supplying a lubricant to said first fluid flow system; a second fluid flow system in said housing, said second fluid flow system being independent of the first fluid flow system; and means for effecting a flow of cooling air through said second fluid flow system, said first flow system communicating downstream from the last of the bearings with which it communicates with said second fluid flow system, whereby the air flowing through the second flow system wll effect a flow of the lubricant supplied to the first fluid flow system therethrough and to the bearings with which said system communicates to thereby lubricate said bearings.

11. A tool or like device comprising: a housing; a working spindle; longitudinally spaced bearings rotatably supporting said spindle in the housing; a motor in said housing for rotating said spindle; and means for lubricating said bearings, said last-mentioned means comprising a passage extending longitudinally through said housing, transverse passages in said housing through which lubricant can flow from the longitudinal passage to each of said bearings and, after circulating through the bearings, back to the longitudinal passage; and means for supplying the lubricant to said longitudinal passage.

12. A tool or like device comprising: a housing; a working spindle; means rotatably supporting said spindle in said housing; an electric motor in and surrounded by said housing for rotating said spindle; and means for removing from said tool heat generated by said motor which comprisies a plurality of longitudinal passages in said housing, said passages extending from end-to-end of said motor, means connecting said passages into at least one serpentine flow channel, and means for effecting a flow of cooling air through said longitudinal passages.

13. A tool or like device comprising: a housing; a working spindle; bearing means rotatably supporting said spindle in said housing; a motor in said housing for rotating said spindle; and means for lubricating said bearing means, said bearing means comprising first and second bearings spaced longitudinally in the housing and a bushing surrounding one of said bearings and supporting it from the housing and the means for lubricating said bearing means including channels opening onto the exterior of said bushing through which a lubricant can flow to thereby reduce the friction between said bushing and said housing, means for supplying a lubricant to said channels, and means providing communication between at least one of said channels and the interior of the bushing through which the lubricant can flow to the bearing supported by said bushing to lubricate said bearing.

14. The device of claim 1, wherein said housing has a section terminating at locations which correspond generally to the extremities of the portion of the device which is to be cooled and wherein the transverse passages are formed in the end portions of said housing section and open onto the end thereof.

* * * * *